Figure 1:
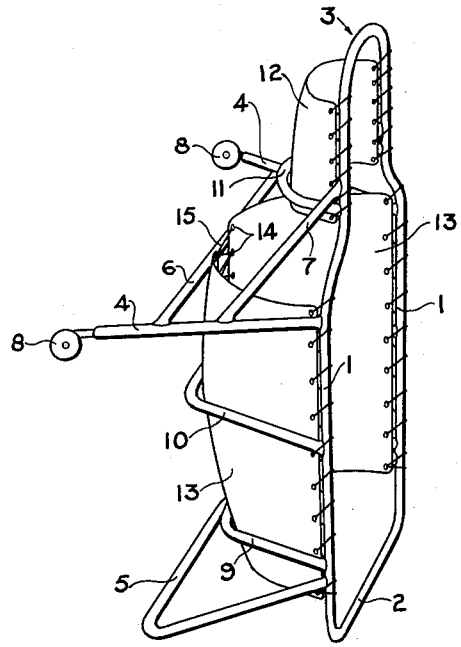

April 18, 1961   C. J. MARSH   2,980,060
DEVICE FOR HOLDING SHEEP
Filed March 24, 1959

Inventor
C. J. Marsh

United States Patent Office 2,980,060
Patented Apr. 18, 1961

2,980,060
DEVICE FOR HOLDING SHEEP
Clifford J. Marsh, Orari, Canterbury, New Zealand
Filed Mar. 24, 1959, Ser. No. 801,644
Claims priority, application New Zealand Mar. 27, 1958
6 Claims. (Cl. 119—103)

The invention relates to devices for holding sheep in an inverted position during the removal of footrot-infected portions of the hooves of the sheep. For convenience, such devices are hereinafter termed "sheep holders."

One of the difficulties experienced with many known kinds of sheep holders is that of preventing a sheep from kicking while it is held within the holder, and the present invention has been devised with the particular object of overcoming this difficulty.

A further and general object of the invention is to provide a sheep holder in which a sheep can be easily placed in an inverted position for the removal of footrot-infected portions from its hooves, and from which the sheep can be easily removed when the treatment of the sheep's hooves has been completed.

A still further object of the invention, in one of its embodiments, is to provide a sheep holder in which a sheep can be easily moved from place to place, at least over a short distance, as is often found desirable, for example when sheep to be treated for footrot are herded in a pen a little distance from the place of treatment.

A sheep holder, when constructed in accordance with the invention, consists of a frame provided with supporting members on which the frame can stand on the ground, and with cross members extending between and secured to opposite side members of the frame, the cross members being inclined downwardly and inwardly from each side member towards the central portion of each cross member, for distances which are less at the end portions of the frame than at the central portion of the frame, the arrangement and relative depths of the cross members being such that a sheep placed on its back within the frame is supported by the cross members in an arched or hunched position in which it is not able to kick freely or with any force.

The frame may be supported at one end on wheels on which the frame, with a sheep held therein, can be moved for short distances if necessary.

The frame may be formed at one end with an extension which is narrower than the rest of the frame at the upper part of the holder, and which is adapted to receive the head of the sheep, the head being supported either on cross pieces of the extension or on a canvas head-rest secured between the sides of the extension.

The frame of the holder may be lined internally with a pair of canvas flaps secured along one edge one to each of the side members of the frame, at the upper edge of the holder, and lying over and against at least two of the cross members of the frame, the lower edges of the flaps being adjustably secured together by lacing so as to form a canvas cradle, the depth of which is variable by tightening or slackening the lacing.

A sheepholder constituting one embodiment of the invention is shown in the accompanying drawings and will now be described in detail by way of example of how the invention can be carried into effect.

Figure 2:
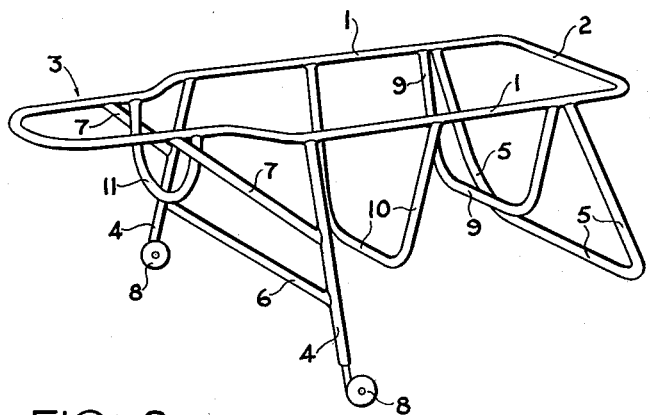

In the drawings:

Figure 1 is a perspective view of the holder according to the said embodiment, the holder being shown in an upended position; and Figure 2 is a perspective view of the frame of the holder, showing the holder in the position in which it normally rests on the ground.

The holder shown in the drawings has a frame, shown by itself in Figure 2, of metal tube or rod, the frame having two parallel side members 1 which are joined at one end of the frame by a transverse end piece 2 and which lead at the other end of the frame into a closed narrowed neck or extension 3 of the frame. The frame is provided near its forward end with a pair of legs 4, and near its rear end with a supporting member 5, the frame being normally supported on the legs 4 and member 5. The legs 4 are situated adjacent to the extension 3, and are braced by a cross piece 6 and by a pair of struts 7 extending between the legs 4 and the sides of the extension 3. The lower ends of the legs 4 are fitted with wheels 8 on which the holder can be moved when the rear end of the holder is lifted by the end piece 2.

The frame is also provided with three cross members 9, 10, 11, also of metal tube or rod, which extend between and are welded or otherwise secured at their ends to the side members 1 of the frame, one cross member (9) being disposed near the rear end of the frame, another (10) being disposed more or less centrally of the frame, and the third (11) being disposed within the extension 3 of the frame at or near the junction of the extension 3 with the main part of the frame. The end portions of the rear and central cross members 9 and 10 are inclined inwardly and downwardly to the connecting central portions of those cross members, the central portions being horizontal, so that the cross members 9 and 10 each form three sides of a trapezium, the fourth side of which is an imaginary line connecting the upper ends of each said cross member. The lower, or central, portions of the cross members 9 and 10 are at different levels in relation to the side members 1, that of the central member 10 being on a lower level than that of the rear member 9. The forward cross member 11 is of arcuate form, concave when viewed from above, and its lowest point, at its central portion, is on a higher level than the lower portion of the rear cross member 9. A piece of canvas 12 (see Figure 1) is secured to and extends between the extended portions of the side members 1 of the frame, to provide a support for the head of a sheep placed within the holder, as will be described.

When a sheep is placed in an inverted position in the holder, its body and hind quarters are wedged in and supported by the central and rear cross members 9 and 10 of the frame, while its neck is supported by the forward cross member 11 and its head by the canvas 12 of the extension 3, the relative disposition and levels of three cross members 9, 10, and 11 being such that the sheep is held in an arched or hunched position in which it cannot kick freely or with any force. The sheep's hooves can then be treated in the usual way for footrot disease, and the footrot-infected portions removed.

A pair of canvas flaps 13 are attached along one edge portion one to each of the side members 1 of the frame, at the main part of the frame, and are provided along their other edge portions with eyeholes 14 through which lacing 15 can be passed to secure the free edge portions of the flaps 13 together and provide a canvas cradle forming a lining within the frame of the holder, above the crossmembers 9 and 10 of the frame. The lower edges of the flaps 13 are shaped to conform to the line of the different levels of the cross members 9 and 10 so that a sheep placed in the canvas-lined holder is held in the arched or hunched position referred to above. By slackening or tightening the lacing 15 so as to increase or decrease the distance between the lower edges of the flaps 13, the effective depth of the cradle so formed can be varied according to the size of the sheep to be placed in the holder.

The rear supporting member 5 of the frame is formed by a single substantially U-shaped length of metal tube or rod, the central portion of which rests on the ground or other support, while the end portions are bent upwardly at a slight inward angle for securement to the rear end portions of the side members 1 of the frame. The member 5, so formed, supports the rear end of the frame at a lower level than the forward end of the frame, so that the frame is inclined downwardly from its forward to its rear end, and can without difficulty be upended on the member 5, as shown in Figure 1, either for reception of a sheep into the holder or to tip a sheep out of the holder when its hooves have been treated in the required manner.

The sheep holder described above can be manufactured fairly cheaply and without any undue difficulty, and by holding the sheep in the manner described it minimises the risk that a person operating on a sheep may receive injury from the operating tool as the result of a kick by the sheep being treated.

What I do claim and desire to secure by Letters Patent of the United States of America is:

1. A sheep holder consisting of an elongated frame including two parallel side members, supporting members secured to said parallel side members on which the frame can stand on the ground, a plurality of cross members extending between and secured to said side members of the frame, a narrowed extension of the frame at one end of the frame, and a head rest secured to and extending between the sides of the said extension and adapted to support the head of a sheep placed within said head rest, said cross members being secured to said frame and inclined downwardly and inwardly from each side member of the frame for distances which are less at the end portions of the frame than at the central portion of the frame, and wherein the arrangement and relative depths of the cross members and the disposition of the head rest in relation to the cross members are proportioned so that a sheet placed on its back within the frame is supported by the cross members and by the head rest in an arched or hunched position which inhibits the ability of the sheep to kick.

2. A sheep holder according to claim 1, wherein the frame of the holder is lined internally with a pair of canvas flaps which are secured along one edge, one to each of the side members of the frame, and which lie over and against at least two of the cross members of the frame, means in the form of a lacing for adjustably securing the lower edges of the flaps together so as to form a canvas cradle, the depth of which is variable by tightening or slackening the lacing.

3. A sheep holder according to claim 1, wherein the supporting members of the frame consist of a pair of legs at the forward end portion of the frame and a substantially U-shaped member at the rear end portion of the frame, wheels on the lower ends of the legs, and the U-shaped member being arranged to support the rear end of the frame at a lower level than the forward end of the frame.

4. A sheep holder according to claim 1, wherein the side members of the frame are joined at one end of the frame by a transverse end piece and at the other end of the frame are formed into a closed narrowed neck which constitutes the said extension.

5. A sheep holder according to claim 1, wherein the cross members are three in number, one being disposed near the rear end of the frame, another being disposed more or less centrally of the frame, and the third being disposed within the said extension, the central portion of the latter cross member being on a higher level than the central portion of either of the other two cross members.

6. A sheep holder according to claim 5, wherein the central and rear cross members each form three sides of a trapezium, the fourth side of which is an imaginary line connecting the upper ends of each of those cross members, while the third cross member, within the extension of the frame, is of arcuate form and concave when viewed from above.

References Cited in the file of this patent

FOREIGN PATENTS

| 11,858 | Australia | Mar. 21, 1933 |
| 147,850 | Australia | Aug. 19, 1952 |